(12) United States Patent
Guyer

(10) Patent No.: US 10,909,547 B1
(45) Date of Patent: Feb. 2, 2021

(54) SYSTEM AND METHOD FOR PLASTIC WASTE DISPOSAL

(71) Applicant: Yankee Scientific, Inc., Medfield, MA (US)

(72) Inventor: Eric C. Guyer, Dover, MA (US)

(73) Assignee: Yankee Scientific, Inc., Medfield, MA (US)

( * ) Notice: Subject to any disclaimer, the term of this patent is extended or adjusted under 35 U.S.C. 154(b) by 0 days.

(21) Appl. No.: 16/748,940

(22) Filed: Jan. 22, 2020

Related U.S. Application Data

(60) Provisional application No. 62/858,869, filed on Jun. 7, 2019.

(51) Int. Cl.
| | |
|---|---|
| *G06Q 30/00* | (2012.01) |
| *B01D 53/14* | (2006.01) |
| *B01D 53/02* | (2006.01) |
| *B09B 3/00* | (2006.01) |
| *F23G 5/50* | (2006.01) |
| *F23L 7/00* | (2006.01) |
| *F23J 15/02* | (2006.01) |

(Continued)

(52) U.S. Cl.
CPC ......... *G06Q 30/0185* (2013.01); *B01D 53/02* (2013.01); *B01D 53/1425* (2013.01); *B01D 53/1475* (2013.01); *B09B 3/0083* (2013.01); *E21B 41/0064* (2013.01); *F23G 5/08* (2013.01); *F23G 5/12* (2013.01); *F23G 5/46* (2013.01); *F23G 5/50* (2013.01); *F23J 15/02* (2013.01); *F23L 7/007* (2013.01); *G06Q 10/10* (2013.01); *G06Q 10/30* (2013.01); *G06Q 20/085* (2013.01); *G06Q 50/04* (2013.01); *G06Q 50/06* (2013.01); *B01D 2257/504* (2013.01); *F23G 2200/00* (2013.01); *F23G 2206/203* (2013.01); *G06Q 50/26* (2013.01)

(58) Field of Classification Search
None
See application file for complete search history.

(56) References Cited

U.S. PATENT DOCUMENTS

| | | | |
|---|---|---|---|
| 4,426,936 A | * | 1/1984 | Kuo ................... B01J 8/002 110/221 |
| 6,029,141 A | | 2/2000 | Bezos et al. |

(Continued)

*Primary Examiner* — David J Laux
(74) *Attorney, Agent, or Firm* — Loginov & Associates. PLLC; William A. Loginov

(57) ABSTRACT

This invention provides a system or method that includes combustion of mixed content solid waste to produce flue gases and separation of carbon dioxide gas in the produced combustion flue gas from other gaseous constituents of the flue gas in an amount produced from the burning of plastic material contained in the mixed content solid waste. The separated carbon dioxide is sequestered in geologic formations, thereby providing environmentally sound disposal and elimination of plastic waste, in one consolidated process, free of the need for separation of plastic waste from other solid or the need to identify and separate the various forms and compositions of plastic waste material. The illustrative disposal of plastic waste hereby is generally free of emission into the atmosphere of carbon dioxide gas. The invention includes a fee-generation process applied to customers, which can quantified and generated in association with the application of the system or method.

20 Claims, 2 Drawing Sheets

(51) Int. Cl.
- *F23G 5/46* (2006.01)
- *F23G 5/12* (2006.01)
- *F23G 5/08* (2006.01)
- *G06Q 10/00* (2012.01)
- *G06Q 50/06* (2012.01)
- *G06Q 50/04* (2012.01)
- *G06Q 20/08* (2012.01)
- *G06Q 10/10* (2012.01)
- *E21B 41/00* (2006.01)
- *G06Q 50/26* (2012.01)

(56) References Cited

U.S. PATENT DOCUMENTS

| | | | |
|---|---|---|---|
| 7,959,376 B1* | 6/2011 | Duesel, Jr. | B09B 1/00 405/129.95 |
| 7,998,714 B2 | 8/2011 | Gellett et al. | |
| 8,252,242 B2 | 8/2012 | Vandor | |
| 8,812,399 B2 | 8/2014 | Jacobsen | |
| 9,834,381 B2 | 12/2017 | Wang et al. | |
| 10,174,943 B2 | 1/2019 | Boulet | |
| 2006/0053791 A1* | 3/2006 | Prentice, III | F23G 5/16 60/645 |
| 2011/0173139 A1* | 7/2011 | Zauderer | C04B 7/243 705/500 |
| 2013/0025188 A1* | 1/2013 | Cheiky | C05F 9/04 44/307 |
| 2013/0266380 A1* | 10/2013 | Capron | E21B 41/0064 405/184.4 |
| 2013/0339216 A1* | 12/2013 | Lambert | C12N 1/12 705/37 |
| 2016/0194262 A1* | 7/2016 | Ravikumar | C07C 29/32 705/35 |
| 2016/0218593 A1* | 7/2016 | Cheiky | H02K 7/1823 |

\* cited by examiner

SYSTEM AND METHOD FOR PLASTIC WASTE DISPOSAL

RELATED APPLICATION

This application claims the benefit of U.S. provisional application Ser. No. 62/858,869, entitled SYSTEM AND METHOD FOR PLASTIC WASTE DISPOSAL, filed Jun. 7, 2019, the teachings of which are incorporated herein by reference.

FIELD OF THE INVENTION

This invention relates to the environmentally responsible elimination of plastic waste

BACKGROUND OF THE INVENTION

Plastic materials, which are produced predominately (over 99%) by the polymerization of fossil hydrocarbons, have become essential to achieving many of mankind's lifestyle and health objectives. Production and use continue to expand. Production of plastics from fossil hydrocarbons has grown worldwide at an astonishing compound annual growth rate of 8.6% since 1950. The U.S. shale gas boom currently fuels a massive buildout of plastics production infrastructure in the United States. Nonetheless, there is a growing dark side to this industry. It involves plastic waste. The negative impacts of plastic waste in the environment are in the news almost daily.

Plastics environmental sustainability is the most critical issue facing the plastics industry today. The Plastics Industry Association, in a policy statement, has recognized that it is increasingly necessary to incorporate sustainability in their business plans to retain their "social license to operate". Dealing with low-grade, post-consumer plastic waste is the biggest sustainability problem faced by the industry. Today it is a simple reality that the only environmentally responsible way to dispose of plastic waste is recycling. Of the several hundred million tons of plastic waste produced annually in the world only about 9% is recycled. Adoption of recycling is constrained by the wide variation and mixture of different plastic materials in post-consumer waste, the difficulty of sorting out the many different polymers from paper, metal, and mineral contaminants and the challenge of processing plastic waste into manufacturing materials as useful and affordable as the virgin product produced directly from oil and gas resources. The sad truth is that most low-quality waste plastic ends up either in landfills, in incinerators or in the environment, as it has very low, or even negative, value. Further adoption of simple incineration of plastic waste, which occurs with about 10% of the current plastic waste in the United States, will produce significant carbon dioxide emissions. Thus, incineration cannot be seen a long-term answer to disposal of plastic waste, as this would fly in the face of carbon emission reductions programs now under way world-wide on account of climate change issues. Other strategies currently being developed involve converting plastic waste to useable fuels. But again, the variation of the available waste feedstock is a processing challenge and the net result is new source of carbon emitting fuel, which is an undesirable strategy in view of today's environmental agenda. Landfilling as a method of disposal of post-consumer waste is not favored by those concerned about the environment and is now illegal in a number of countries. The concerns with landfills are that they eventually leak toxic liquids into the ground and produce methane gas, which is a much more potent greenhouse gas than carbon dioxide.

Carbon capture and sequestration technologies have been developed and deployed to deal with the concerns about carbon dioxide emissions and their impact on the climate. Many of these technologies have been developed for application to fossil fuel burning energy plants. These technologies include use of absorbent liquids that can capture carbon dioxide from flue gas, membranes to separate the carbon dioxide gas from flue gas, physical absorption from the flue gas, and cryogenic distillation of the flue gas. These technologies have been configured in complete systems that produce high pressure and near pure carbon dioxide gas that can then be injected into appropriate deep geologic formations, legally under applicable government regulations, for permanent removal from the environment Business methods are sometimes an integral part of new technological invention. Many business methods have been patented that are have been enabled by digital electronic communications.

Environmental offsets are now widely used to mitigate unavoidable real and potential impacts of certain activities undertaken by both individuals and businesses. One form is carbon offset wherein an entity producing a certain amount of carbon emissions to the atmosphere that is unavoidable, such as involving travel by jet, pays another entity to remove an equal amount of carbon dioxide from the atmosphere. Offsets have been proposed for use with the problem of plastic waste, but this has been limited to requesting payment for the collection of discarded plastic waste from the natural environment, such as oceans and rivers, and not for its disposal by environmentally sound means.

In view of the foregoing, it is desirable to provide mechanisms to eliminate plastic waste in a manner that is both efficient and carbon neutral.

SUMMARY OF THE INVENTION

This invention overcomes disadvantages of the prior art by providing a system or method that converts the plastic materials contained in low-quality, contaminated mixed plastic waste, the largest and most challenging form of waste plastic, into carbon dioxide and permanently sequesters the carbon dioxide in geologic formations. This system or method essentially returns the carbon, originally extracted from ancient geological formations, that is used to produce plastic materials back to the same, or similar, geologic formations for permanent disposal. Certain, and widely occurring, geologic formations, such as saline aquifers, are known to have immense capacity to permanently store carbon dioxide and the use of such formations has been extensively investigated and are used, today, for permanent disposal of carbon dioxide, sometimes in association with enhanced oil recovery operations and natural gas production.

Using the established environmental offset benefits concept, together with product branding strategies, revenue to implement this process will be derived from the varied and multiple businesses engaged in the life cycle of plastic materials, from polymer production to end-product manufacture to disposal. Application of the environmental offsets along with product a branding strategy to implement this process is part of the system and method invention. By providing the service of disposing of plastic waste in an environmentally acceptable fashion, the system and method herein enables the still growing plastics industry to continue to offer the value of conventional plastic materials to their customers while addressing important environmental concerns head on. Compared to alternative ideas for plastic waste management that involve major changes to how and what plastics are produced and used, this system and method offers the best opportunity for existing plastic materials and plastic product manufacturers to continue and grow their businesses without requiring high-risk technological change and business disruption. The system or method enables the continued use of the economy, unmatched material properties, and utility of plastic materials made from fossil hydrocarbon resources, while simultaneously providing the user a real, readily-recognized and quantifiable commitment to solving the growing problem of waste plastic in the environment.

In an illustrative embodiment, a system and method herein comprises an arrangement for combusting mixed content solid waste, in which at least a portion of the solid waste comprises plastic material, in air to produce flue gas that contains carbon dioxide. The carbon dioxide gas contained in the combustion flue gas is separated from other gaseous constituents of the combustion flue gas at a rate, or in an amount, approximately equal to an amount of carbon dioxide gas produced by the combustion of plastic material contained in the mixed plastic waste. The separated carbon dioxide is then sequestered in geologic formations, so as to provide for elimination and disposal, in one consolidated process, and free of the need for separation of the plastic material from other non-plastic solid waste. A plurality of forms and compositions of the plastic material is originally produced from fossil hydrocarbons that are typically present in municipal and other solid waste. The sequestering is performed substantially free of emission into the atmosphere of carbon dioxide gas. At least one of the steps of combusting, separating and sequestering is controlled to optimize performance according to desired operating parameters. The step of combusting can include inputting air that is enriched in oxygen up to 100%. Illustratively, the carbon dioxide produced by the combusting of the plastic material is removed from the combustion flue gas in a process unit by contact with a solid or liquid medium that absorbs or adsorbs the carbon dioxide, with the absorbed or adsorbed carbon dioxide subsequently being separate from the recyclable medium in a desorption unit to produce a stream of carbon dioxide gas of high purity. The carbon dioxide can be separated from the combustion flue gas, and sequestered, at a rate different from the actual of current production of carbon dioxide from plastic combustion in order, at any given time, to maximize a current, time dependent, sales value of the electric power that can be generated by the combustion of the mixed solid waste, or otherwise meet contractual commitments, over time, for carbon capture related to the disposal of plastic waste. The system and method can include a continuous or periodic monitoring and sampling of the input flow of mixed content solid waste material into the combustion unit to determine an average mass flow of the plastic material in the mixed content solid waste, or determining a mass flow of plastic material in combination with a type or types of plastic material, contained in the total mass flow, wherein the monitoring facilitates determination of a mass flow rate of the carbon dioxide in the combustion flue gas exhausted from a solid waste combustion unit due to combustion of the plastic material. A carbon dioxide absorption and capture unit can be provided, and operated, based on the average total concentration of the carbon dioxide in the absorption system that will occur as result of co-incident combustion of both the plastic material and biologically derived organic materials in the mixed content solid waste. The system and method can also include monitoring of the carbon dioxide concentration in flue gas entering into, and exhausted from, a carbon dioxide absorption unit to maintain a balance between the production of carbon dioxide from combustion of the plastic material and absorption and separation of an equal amount of carbon dioxide from the combustion flue gas. That balance can be achieved either (a) essentially instantaneously, or (b) over period of time, comprising at least one of hours, days, and months. Illustratively, heat energy required for operation of the sequestering process is extracted from the mixed-content waste combustion process. In embodiments, the system and method is arranged to measure of a flow of the carbon dioxide separated and sequestered for certifying an amount of the carbon dioxide captured hereby. This information is used to generate fees to be paid by customers for disposal of the plastic waste provided by the customers to the mixed content solid waste. In a further process step, the separated carbon dioxide in the step of sequestering is pressurized, so as to enable at least one of (a) injecting into geologic formations within the earth, (b) transporting by pipe line, and (c) transporting by vehicle. Heat generated by the step of combusting, using a waste combustion unit, first operates in a thermodynamic cycle for the production of electric power in a power cycle, and the heat rejected from the power cycle then powers a carbon dioxide desorber unit operating in conjunction with a carbon dioxide absorption or adsorption unit, so as to produce a nearly pure stream of carbon dioxide from the combustion flue gas. In a further step, a mass of biologically derived organic material is added to a primary process feed of the mixed content solid waste, in the step of combusting by a combustion unit, to decrease a percentage of the carbon dioxide in the combustion flue gas that is attributable to the combustion of the plastic material; while not otherwise increasing a net amount of the carbon dioxide emitted in the environment. In this manner, the biologically derived organic material is composed of carbon dioxide originally contained in the atmosphere for a carbon-neutral outcome from combustion. In embodiments, natural gas, or other carbon-containing fuel, is added to a primary process feed of the mixed content solid waste in the step of combusting by a combustion unit to decrease a percentage of the carbon dioxide in the combustion flue gas that is attributable to the combustion of the plastic material.

In further embodiments, the system and method described above can be employed in generating fee income, by contracting with producers, users, and sellers of fossil-hydrocarbon-based plastic materials and products based, at least in part, upon a mass of plastic material contained in the products and materials produced, used or sold. The fee to be paid by the producers, users, and sellers, can be determined herein based upon a mass of carbon dioxide sequestered in the step of sequestering and the mass of plastic material processed. Illustratively, the system and method can further include quantifying and collecting revenue, by way of an automated data and monitoring unit, from producers, users or sellers of fossil-hydrocarbon-based plastic materials and products in proportion to the mass of plastic materials the producers and users manufacture, use, or sell. This serves the purpose of enabling the owners and operator of the facility to undertake, for generation of revenue, disposal of fossil-hydrocarbon-based plastic materials on behalf of the plastic product manufacturers, users, or sellers. In embodiments, the system and method can include marking plastic materials and products by a producer, user, and seller of products, as they are sold or used, to indicate that the producer, user, or seller is removing an substantially equivalent mass of plastic material from the general environment and permanently disposing of it to limit the general accumulation of plastic materials in the environment. In embodiments, a facility operating the system and method interconnects with a geologic formation capable of receiving and permanently storing the carbon dioxide, located substantially adjacent to performance of the steps of combusting, separating and sequestering (i.e. the facility), so as to minimize a length of pipeline or conduit carrying the carbon dioxide to the geologic formation. In embodiments, the system and method described above can be performed at a facility that captures carbon dioxide gas from the combustion flue gas at a rate or in an amount that is less than, or greater than, an amount produced by the combustion of the plastic material.

BRIEF DESCRIPTION OF THE DRAWINGS

The invention description below refers to the accompanying drawings, of which.

DETAILED DESCRIPTION

Figure 1:
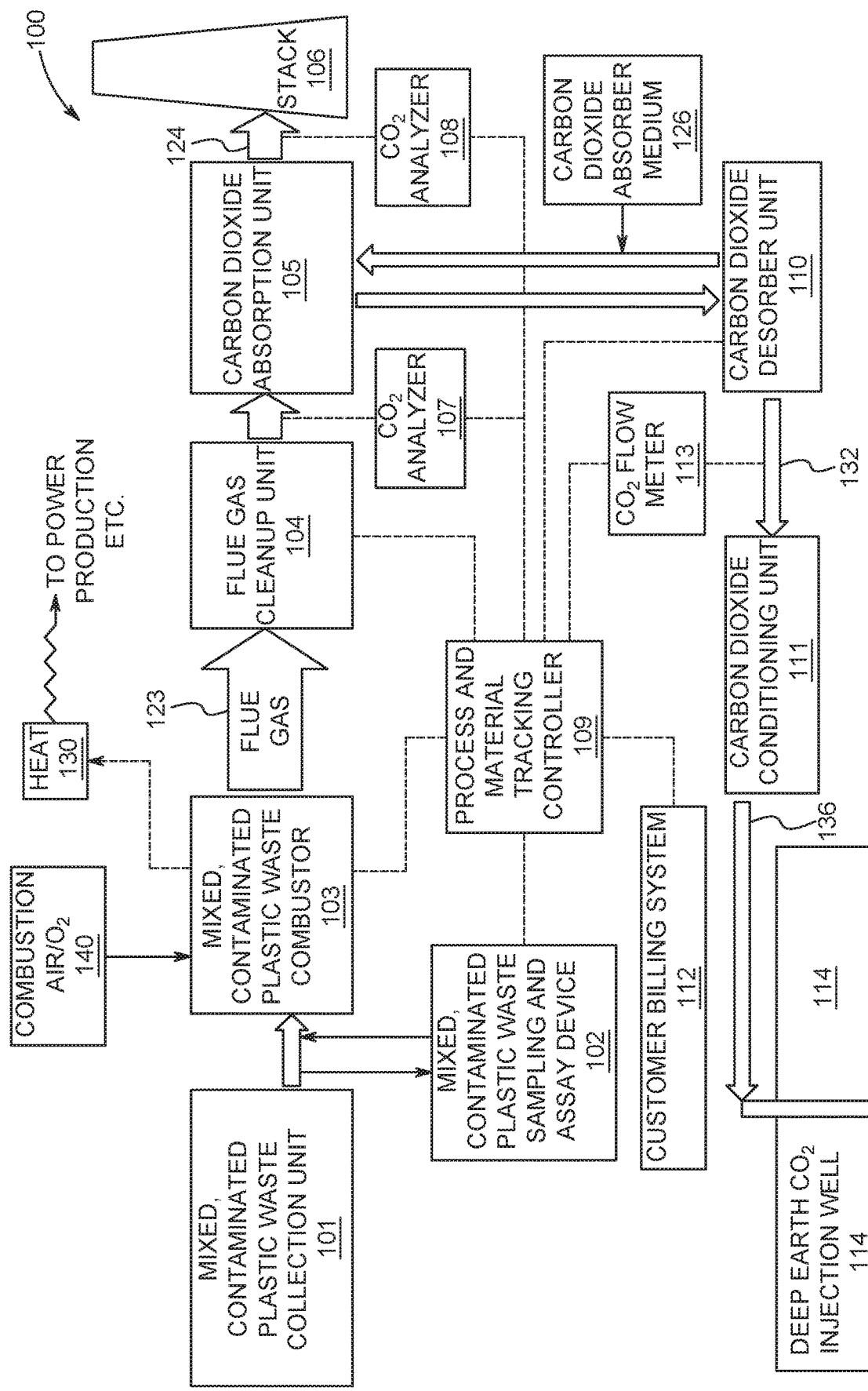
FIG. 1 is a block diagram showing a system and method for plastic waste disposal according to an exemplary embodiment.

As depicted in the exemplary system arrangement 100 depicted in FIG. 1, the invention is a solid waste processing system or method that, at collection unit 101, inputs, as feedstock material, mixed content solid waste, such mixed solid waste being of highly varying and unknown specific composition containing a variety of plastic material formulations mixed and contaminated, to varying and random amounts, with paper and other materials of biological origin, such as wood and food waste, as well as metal, and minerals. Municipal solid waste generally has such mix of materials and feedstock into this process may include such municipal solid waste mixture remaining after valuable and recyclable materials have been previously recovered from the original supply of solid waste.

The next step in the system and associated process is the continuous monitoring and sampling of the incoming mixed material in sampling and assay device 102 to ascertain the mass of plastic entering the facility, and thus the total flow of carbon contained in plastic into the solid waste processing system. This can be accomplished via a variety of procedures and/or techniques—for example, by manual inspection and assay of plastic content in the incoming waste or by such techniques as spectroscopy, x-ray transmission, or laser-aided identification. By way of non-limiting example, routine periodic sampling of a small portion of the incoming stream will be sufficient to make a statistically reliable determination of the flow of plastic material into the process. The mass of plastic material entering the system may characterized by polymer type and relative amounts, but this is not essential to useful application of the invention.

The following step of the system and process 103 is the combustion of the complete mass of mixed and contaminated waste containing plastic, with provisions for dealing with the non-combustible materials contained in mixed solid waste and with provisions for removing pollutants from the flue gases 123 produced from the combustion. This functionality is represented by a flue gas cleanup unit 104. It is recognized that plastic materials have a specific heat of combustion similar to other hydrocarbons such as oil and natural gas and are readily combustible in combination with other combustible and non-combustible materials found in mixed solid waste materials, with the proper facilities. Such processes and equipment are commercially available as employed in waste to energy plants and state-of-the-art incinerators.

The next step in the system, and its associated process is the capture and separation of the carbon dioxide from the flue gas produced by the combustion of the plastic material. The objective is to capture, by one of several available carbon dioxide absorption technologies 105, which (by way of example) use a fluid or solid medium to preferentially absorb carbon dioxide from the mixed gas streams, an amount of carbon dioxide gas that is equal to, or near equal to, the amount of carbon dioxide in the flue gas attributable to the combustion of the plastic content of the waste. Mixed solid waste combustion typically results in flue gas concentrations of carbon dioxide of about 10%, whilst the carbon dioxide associated with the combustion of plastic constituents of the solid waste feed into the combustion process may range below this amount, depending on the relative amount of plastic in the combustion feedstock in comparison to the amount of biologically-derived, carbon-containing combustible material in the feedstock. Generally, it can be recognized, that other than plastic, the combustible materials typically found in municipal solid waste are nearly all materials that contain carbon that has been come for the earth's atmosphere. Recognition of the fact that plastic materials, when normally burned release a net amount of carbon into the atmosphere, whilst the burning of materials containing carbon that is biologically derived does not, is a key insight enabling the application of this invention as responsible manner of eliminating plastic waste from the atmospheric environment of the earth in light of the growing concern about carbon emissions into the atmosphere and their impact on the earth's climate. The balance of constituents in the post-$CO_2$-removal flue gas 124 are substantially comprised of nitrogen and water vapor. This flue gas 124 is exhausted via a conventional exhaust stack arrangement 106. Note that the depicted $CO_2$ analyzer 108 monitors this flow of flue gas 124 in a manner described herein. For example, in a case with plastic representing about 50%, by weight of the solid waste entering the process, the percentage of carbon dioxide in the combustion flue gases may be about 70% on account of actual ratio of plastic based carbon and biologically derived carbon in the combustible content of the solid waste feedstock. Capturing the carbon dioxide produced as a result of the combustion of the biological-origin organic materials (paper, food waste, wood products, etc.) in the solid waste feedstock is not of interest in this process since it would already be considered net-zero with respect to contribution of carbon into the atmosphere and not of direct interest to the customers paying only for disposal of waste plastic, by use of this invention, that was originally produced from fossil hydrocarbon resources.

Removal from the input flue gas 123 of only the fraction of carbon dioxide in the flue gas determined to be originating with the plastic waste minimizes the cost of carbon dioxide absorption and capture, per unit mass, compared to the cost of capturing all, or nearly all, of the carbon dioxide in the flue gas, as has been proposed for various power plant carbon capture processes for power plants operating solely with fossil hydrocarbon fuels such as coal, oil, and natural gas and which are operated primarily for electric power production and not primarily for waste elimination or disposal. This is because the greater the fraction of the total carbon dioxide that must be removed from the flue gas, the larger the capture system equipment is needed for a given total flue gas flow and carbon dioxide removal rate. Such carbon dioxide capture systems work on mass concentration gradient of carbon dioxide gas between the carbon dioxide vapor pressure of flue gas 123 and the effective (i.e. lower) equilibrium vapor pressure of carbon dioxide of the absorbent and equipment sizing is related to the log mean vapor pressure driving force existing between the inlet and outlet of the absorber. The size, and cost, of the equipment to remove carbon dioxide from flue gas increases rapidly as outlet concentration that must be achieved becomes small compared to the inlet concentration. Thus, there is significant economy to be achieved in the capture of carbon dioxide, per unit mass of carbon dioxide, from flue gas when the goal is to recover only that portion arising from the plastic constituents in the combusted sold waste. To achieve this desired manner of operation the invention includes the carbon dioxide concentration analyzers 107 and 108 located at the input and output of the absorption unit 105, respectively. The data continuously available from these analyzers, combined with the information contained from the sampling and assay unit 102, allows for operation of the absorber system in the most effective manner for removal of only the amount of carbon dioxide from the flue gas 123, 124 arising from the combustion of plastic. The carbon dioxide absorbed in the absorption medium 126 of the absorption unit 105 then flows, with the absorption medium, to a carbon dioxide desorber unit 110. Typically, desorber units operate by heating of the absorption media (126) to drive off the nearly pure carbon dioxide gas from the media. Heat for use in operation of the carbon dioxide desorber unit 110 can be recovered in the combustion of the waste in the combustor 103.

Heat 130 produced by the combustion of the plastic and other waste can also first be used for production of electric power in a thermodynamic cycle, using steam or other medium, and then heat from power cycle can be reclaimed for further use in the carbon dioxide absorption system. Other uses for process heat 130 are also contemplated—for example as part of other manufacturing processes and/or water desalination, among other possible applications.

In the next step of the system and associated process, the nearly pure carbon dioxide gas 132 produced by the absorber 110 is then compressed in the carbon dioxide conditioning unit 111 to the levels of pressure that facilitate transport in pipelines (136), and/or injection into wells that connect the processing facility to the candidate deep geologic structures which are to be used to sequester, and permanently remove, the carbon dioxide from the surface of the earth, with such pressure typically about 1000 psi or more. The final stage is the actual injection of the high-pressure carbon dioxide, at injection well 114, into the candidate geologic structure. It should be clear to those of skill that the location and preparation of such a well is known in the art.

The illustrative process measurement features of the invention (i.e. the mixed waste sampling and assay device 102 and the carbon dioxide analyzers 107 and 108), when combined with the carbon dioxide flow meter 113 that monitors the actual flow of nearly pure carbon dioxide 132 from the carbon dioxide desorber unit 110, allow the system process and material tracking controller 109, along with connected billing system 112, to accurately monitor and moderate the operating efficiency of the system and overall process 100, and correctly bill customers for the costs of processing of plastic waste, and only the plastic waste, into the deep earth as sequestered carbon dioxide. The operation, inputs and outputs of the controller 109 are described further below.

In certain applications of the system and method, it can be desirable to add other combustible carbon containing material to the solid waste stream feed into the combustion unit 103. This can be biologically derived organic material (i.e. biomass) such as wood, paper, or food waste or it may be natural gas or other fossil fuel such as natural gas, oil, or coal. A purpose of including such supplementary carbon-based combustibles is to increase heat (130) and generation power of the combustion unit 103 while decreasing the fraction of carbon dioxide in the fuel gas due to the combustion of plastic, which may reduce the size and cost of the absorption unit needed to absorb and capture the amount carbon dioxide that is attributable to the combustion of plastic. In other applications of the system and method 100, the oxygen content of the makeup air 140 used for the combustion of the solid waste in the combustion unit 103 can be enriched by any of several commercial oxygen-air separation systems for the purposes of increasing the carbon dioxide content of the flue gas relative to the nitrogen content as normally experienced with combustion air at normal oxygen concentration, again to the end effect of reducing the separation duty and cost of absorption and capture of the amount of carbon dioxide produced by the combustion of plastic materials.

The system and method can be used to generate economic value for the operator(s) via an associated fee-generation process. A first step in this process includes contracting with producers, users, and sellers of plastic materials or products for the payment of revenue, to the owners/operator(s) of the depicted processing system 100. As part of the economic model, fees can be paid by the contracted producers, users and sellers for the right to mark their plastic materials and products as being produced with a "net zero", or other similar, identifying mark that is controlled by the owners/operator(s) of the system and method 100. Notably, the elimination of plastic waste without release of carbon to the atmosphere is seen to have increasing significant economic value as concerns about climate change increase in around the world and could incentivize customers to preferentially seek out such "net-zero" marked products. Use of this marking by plastic materials and products producers will signify that they are acting in a socially responsible way to prevent the accumulation of plastic waste in the environment due to their use of plastic in their products and are permanently disposing an equal or similar amount of plastic in manner that is consistent with concerns about carbon dioxide emissions. Thus, in a net sense, they are not contributing to the problem of accumulation of plastic waste in the environment nor are they contributing to accumulation of carbon dioxide in the atmosphere.

A second step in the fee-generation process is the automated tracking of the actual amount of plastic waste processed in facility of this invention and billing customers, via the data processing and billing system 112, for only that amount of plastic waste disposed of the facility in accordance with the specification of above-mentioned disposal contracts.

A third step in the fee-generation process is the actual branding, by contracted customers, of their products with the above-described "net zero" brand, or similar identifying mark, for the benefit of demonstrating to their customers, and the community in general, that they are producing and using plastic with recognition of the need to address the full life cycle of plastic materials without harm to the environment, especially with regard to carbon dioxide accumulation in the atmosphere. Such branding can involve marking some or all plastic products of the contracted customer or may be also used in their product or operations advertising Embedded in this system and method invention is the important concept that the specific plastic materials processed in the facility need not be the specific plastic materials produced or sold by a particular party having engaged in such a plastic waste branding contract, since the net environmental benefit of this invention is not reliant on such a one-to-one correspondence between the produced and disposed plastic materials, similar in a fashion as has been practiced with carbon "offsets" for mitigating the environmental impacts of the use of fossil fuels in electricity generation and transport propulsion.

In the system and method 100 shown in FIG. 1, the combustion unit 103 can be characterized as a waste-to-energy plant, which partly converts the heat of combustion of the plastic, and other combustible material mixed with the plastic waste, into electric power (or other heat-utilizing activities (as described above), as well as carbon dioxide containing flue gas and heat. Illustratively, a significant fraction of the electric power produced in this configuration of the invention can be used to operate the carbon dioxide capture and storage system. As under the fee-generation process described herein, there is a contractual value associated with the removal of carbon dioxide produced from the combustion on plastic waste, there would also be a value for any net electric power produced by the system and method 100 of FIG. 1, which is exported to the electric grid as a saleable commodity. Thus, the system and method 100 of FIG. 1 can produce economic value (fee-generation) via at least two discrete methods—one being the capture and sequestration of waste CO2, and the other being the sale of electricity/heat energy and to vary the relative amounts of each, increasing one while decreasing the other. The value of electricity is significantly time-dependent and thus there exist opportunities to maximize operating revenue by not operating the CO2 capture and storage system (so as to divert more generated energy directly to power-generation and not sequestration) during some periods of high electric power value, thereby increasing the amount of electric power available to be sold to the grid. Thus, an additional function of the system control system 109 can be to automatically track the current sales value of electric power and to perform decision making as to whether or not to fully or partially suspend operations of the carbon capture and sequestration system in order to sell, to the grid, the electric power that would otherwise by consumed in the capture and sequestration process. At other times, when the market price of electric power is lower, the facility (system and method 100) can be operated in such a manner as to make up for the foregone capture of carbon dioxide, even if it means recovering more carbon dioxide than is currently being produced by the combustion of plastic. The set of inputs and outputs of the controller 109 for this embodiment of the invention is shown in FIG. 2, which is now described in further detail.

Figure 2:
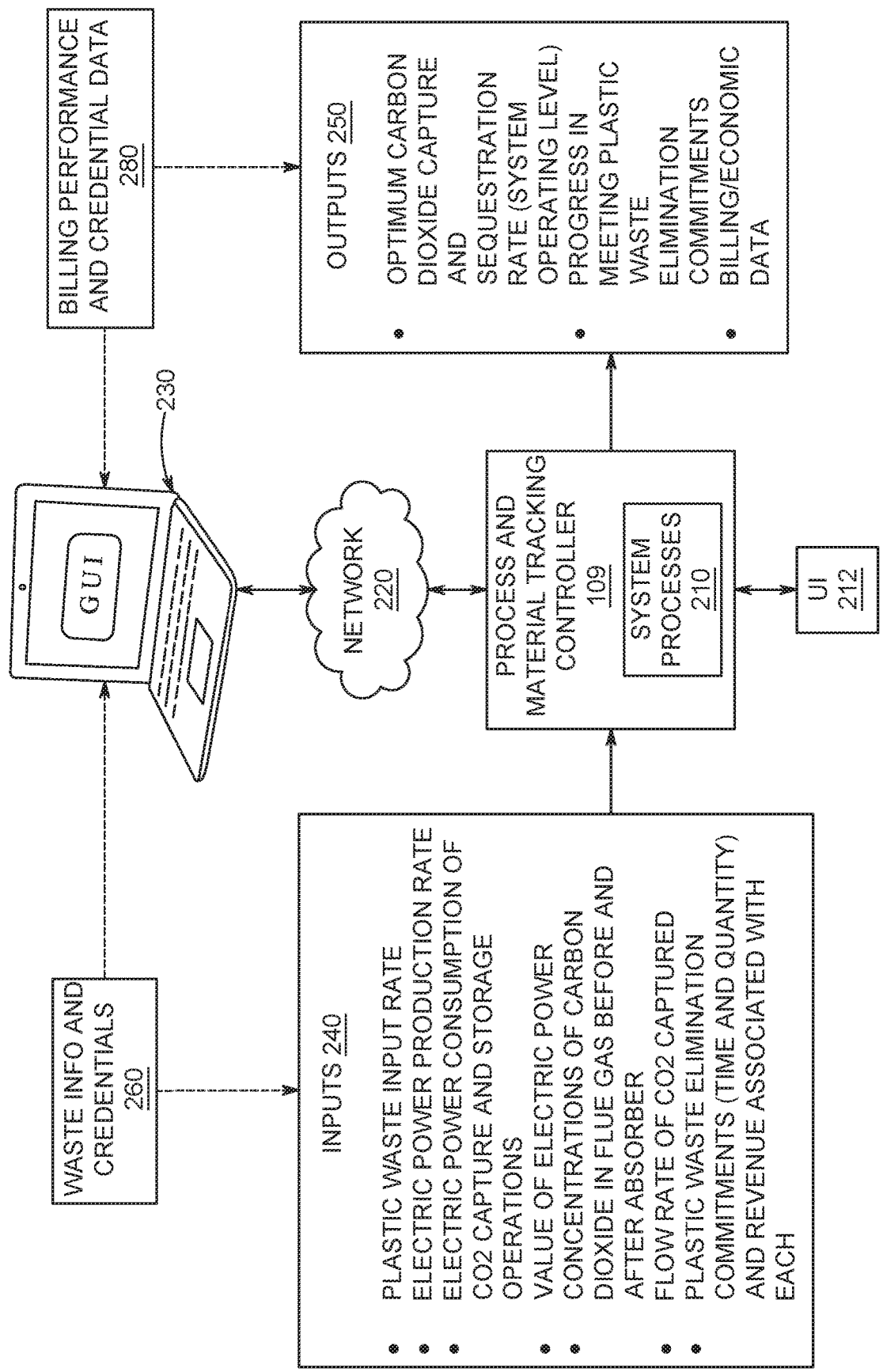
FIG. 2 is block diagram indicating the primary input and output parameters of the system controller and financial billing (fee-generation) system according to an exemplary embodiment.

As shown in FIG. 2, the controller 109 can define any acceptable data handling and/or processing device, including, but not limited to a general purpose, or custom-built, server, PC, laptop, tablet, handheld (smartphone), and/or cloud-computing environment. The controller 109 can operate one or more processes and/or sub-processes that are instantiated hardware, firmware and/or software, consisting of non-transitory computer-readable program instructions. These are represented herein generally as system processes 210. Appropriate user interfaces (UI) 212 are used by system operators to monitor and adjust control and analysis parameters in a manner clear to those of skill. The controller can be interconnected via an appropriate network (e.g. the Internet) 220 to one or more remote computing devices (e.g. servers, PCs, laptops, tablets, smartphones, etc.) 230 of customers and other interested parties. The computing device(s) 230 can operate an appropriate interface, such as a web browser that allows display and manipulation of needed data related to billing and performance with respect to the user's account. Security and credentialing can also be managed by the browser, in association with processes operating on the controller 109. Note that the controller 109 can be implemented as a series of local and/or remote computing devices with differing functions. For example, a separate billing computer can be located offsite from the facility and communicate with users directly, receiving operational data from local computers associated more-directly with the facility and controller architecture.

As described above, data inputs 240 associated with the controller arrangement 109 include, but are not limited to:
(a) Plastic Waste Input Rate;
(b) Electric Power Production Rate;
(c) Electric Power Consumption of CO2 Capture and Storage Operations;
(d) Value of Electric Power;
(e) Concentrations of Carbon Dioxide in Flue Gas Before and After Absorber; and
(f) Flow rate of CO2, Captured Plastic Waste Elimination Commitments (Time and Quantity) and Revenue Associated with Each.

The associated data 260 provided via the user computing device 230 and network 220 are shown in part.

As also described above, outputs 250 of the controller arrangement 109 include, but are not limited to:
(a) Optimum Carbon Dioxide Capture and Sequestration Rate (System Operating Level);
(b) Progress in Meeting Plastic Waste Elimination Commitments; and
(c) Various Billing and Economic Data.

The associated data 280 provided to the user computing device 230 from the controller 109 via the network 220 are shown in part.

A further feature of this invention is the function of the data processing and billing system 112. An owner/operator of a facility that performs the system and method herein is likely to contract with a wide variety of customers for the elimination of plastic waste under the environmental branding/trademarking (e.g. "net-zero") process described above. Such contracts are arranged, typically, using electronic transactions via (e.g.) the depicted client computing device 230 and associated network 220. Each contract can differ with respect the time schedule and amount of plastic product conversion to carbon dioxide and subsequent sequestration as well as the revenue to be recovered from the customer per unit mass of plastic waste processed. Thus, as a part of this system and method, the billing unit 112 can incorporate logic (processes) that ensures that all contract obligations are met on schedule, while simultaneously maximizing the combination of plastic waste processing revenue and electric power production. In its operation, the data processing and billing system 112 of this system and method can provide the output needed for appropriate auditors to independently verify to customers that the contractual obligations to eliminate plastic by the carbon capture and sequestration process are met.

It should be clear that the above-described system and method provides a versatile, efficient and robust process for permanent elimination of undesirable plastic waste that can optimize power generation and also minimize excess CO2 as appropriate to the circumstances. The system and method can afford both users and the facility operator a number of fee-generating and/or income sources.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software-based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A method comprising of the steps of:
    combusting mixed content solid waste, in which at least a portion of the solid waste comprises plastic material, in air to produce combustion flue gas that contains carbon dioxide;
    recording and controlling a rate of plastic waste contained in the mixed content solid waste that is provided to the combustion process;
    separating carbon dioxide gas contained in the combustion flue gas from other gaseous constituents of the combustion flue gas at a rate, or in an amount, approximately equal to, or proportional to, an amount of carbon dioxide gas produced by the combustion of plastic material contained in the mixed plastic waste; and
    sequestering the separated carbon dioxide in geologic formations, so as to provide for elimination and disposal of said plastic waste contained in the mixed content solid waste, in one consolidated process and free of the need for separation of the plastic material from other non-plastic solid waste, the step of sequestering being substantially free of emission into the atmosphere of carbon dioxide gas.

2. The system of claim 1 wherein step of combusting includes inputting air that is enriched in oxygen up to 100%.

3. The method of claim 1 wherein carbon dioxide produced by the combusting of the plastic material is removed from the combustion flue gas in a process unit by contact with a solid or liquid medium that absorbs or adsorbs the carbon dioxide, with the absorbed or adsorbed carbon dioxide subsequently being separate from the recyclable medium in a desorption unit to produce a stream of carbon dioxide gas of high purity.

4. The method of claim 1 wherein the carbon dioxide is separated from the combustion flue gas, and sequestered, at a rate different from the actual of current production of carbon dioxide from plastic combustion in order, at any given time, to maximize a current, time dependent, sales value of the electric power that can be generated by the combustion of the mixed solid waste, or otherwise meet contractual commitments, over time, for carbon capture related to the disposal of plastic waste.

5. The method of claim 1, further comprising, continuous or periodic monitoring and sampling of the input flow of mixed content solid waste material into the combustion unit to determine an average mass flow of the plastic material in the mixed content solid waste, or determining a mass flow of plastic material in combination with a type or types of plastic material, contained in the total mass flow, wherein the monitoring facilitates determination of a mass flow rate of the carbon dioxide in the combustion flue gas exhausted from a solid waste combustion unit due to combustion of the plastic material.

6. The method of claim 1, further comprising, operating a carbon dioxide absorption and capture unit based on the average total concentration of the carbon dioxide in the absorption system that will occur as result of co-incident combustion of both the plastic material and biologically derived organic materials in the mixed content solid waste, of the step of operating being arranged for capturing carbon dioxide derived from plastic materials, in which a higher concentration of carbon dioxide in the flue gases results from the co-incident combustion.

7. The method of claim 1, further comprising, monitoring of the carbon dioxide concentration in flue gas entering into, and exhausted from, a carbon dioxide absorption unit to maintain a balance between the production of carbon dioxide from combustion of the plastic material and absorption and separation of an equal amount of carbon dioxide from the combustion flue gas, with the balance being achieved either (a) essentially instantaneously, or (b) over period of time, comprising at least one of hours, days, and months.

8. The method of claim 1 wherein heat energy required for operation of the sequestering process is extracted from the mixed-content waste combustion process.

9. The method of claim 1, further comprising, measuring of a flow of the carbon dioxide separated and sequestered for certifying an amount of the carbon dioxide captured hereby, and using this information to generate fees to be paid by customers for disposal of the plastic waste provided by the customers to the mixed content solid waste.

10. The method of claim 1, further comprising, pressurizing the separated carbon dioxide in the step of sequestering, so as to enable at least one of (a) injecting into geologic formations within the earth, (b) transporting by pipe line, and (c) transporting by vehicle.

11. The method of claim 1 wherein heat generated by the step of combusting, using a waste combustion unit, first operates in a thermodynamic cycle for the production of electric power in a power cycle, and the heat rejected from the power cycle then powers a carbon dioxide desorber unit operating in conjunction with a carbon dioxide absorption or adsorption unit, so as to produce a nearly pure stream of carbon dioxide from the combustion flue gas.

12. The method of claim 1, further comprising, adding a mass of biologically derived organic material to a primary process feed of the mixed content solid waste in the step of combusting by a combustion unit to decrease a percentage of the carbon dioxide in the combustion flue gas that is attributable to the combustion of the plastic material while not otherwise increasing a net amount of the carbon dioxide emitted in the environment, whereby the biologically derived organic material is composed of carbon dioxide originally contained in the atmosphere.

13. The method of claim 1, further comprising, adding natural gas or other carbon containing fuel to a primary process feed of the mixed content solid waste in the step of combusting by a combustion unit to decrease a percentage of the carbon dioxide in the combustion flue gas that is attributable to the combustion of the plastic material.

14. The method of claim 1, further comprising, generating fee income by contracting with producers, users, and sellers of fossil-hydrocarbon-based plastic materials and products based, at least in part, upon a mass of plastic material contained in the products and materials produced, used or sold and determining a fee amount, to be paid by the producers, users, and sellers, based upon a mass of carbon dioxide sequestered in the step of sequestering and the mass of plastic material processed.

15. The method of claim 14 performed at a facility that captures carbon dioxide gas from the combustion flue gas at a rate or in an amount that is less than, or greater than, an amount produced by the combustion of the plastic material.

16. The method as set forth in claim 1, further comprising, quantifying and collecting revenue, by way of an automated data and monitoring unit associated with the steps of the method of claim 1, from producers, users or sellers of fossil-hydrocarbon-based plastic materials and products in proportion to the mass of plastic materials the producers, users or sellers manufacture, use, or sell for the purposes of enabling the owners and operator of the facility to undertake, for generation of revenue, disposal of fossil-hydrocarbon-based plastic materials on behalf of the plastic product manufacturers, users, or sellers.

17. The method of claim 1, further comprising, marking plastic materials and products by a producer, user, and seller of products, as they are sold or used, to indicate that the producer, user, or seller is removing an substantially equivalent mass of plastic material from the general environment and permanently disposing of it to limit the general accumulation of plastic materials in the environment.

18. The method of claim 1, further comprising, interconnecting with a geologic formation capable of receiving and permanently storing the carbon dioxide, located substantially adjacent to performance of the steps of combusting, separating and sequestering so as to minimize a length of pipeline or conduit carrying the carbon dioxide to the geologic formation.

19. The method of claim 1 performed at a facility that captures carbon dioxide gas from the combustion flue gas at a rate or in an amount that is less than, or greater than, an amount produced by the combustion of the plastic material.

20. A system that operates in accordance with the steps of the method of claim 1.

* * * * *